July 3, 1928.
M. M. BISHOP
INSTRUCTIONAL MUSICAL HARMONY CARD GAME
Filed Jan. 28, 1927
1,675,528
INVENTOR.
Mabel M. Bishop
BY
Erwin Wheeler & Woolsey
ATTORNEYS Patented July 3, 1928.

1,675,528

UNITED STATES PATENT OFFICE.

MABEL M. BISHOP, OF MILWAUKEE, WISCONSIN.

INSTRUCTIONAL MUSICAL-HARMONY CARD GAME.

Application filed January 28, 1927. Serial No. 164,195.

This invention relates to improvements in instructional musical harmony games.

Objects of this invention are to provide an instructional musical harmony card game by means of which the fundamental or elementary principles of harmony may be taught and the development of proficiency expedited by competition of the pupils in a game wherein success largely depends not only upon a fair understanding of such elementary fundamentals of harmony as the theory of scales and keys, the origin, inversion, construction and cadence progressions of those common chords built on the three most important degrees of the scale, but also upon quick perception of the meaning of the symbols upon the cards, coupled with the knowledge of what other cards are necessary to complete any given book.

A further object is to provide an instructional musical harmony game which is peculiarly adapted to be played by varying numbers of players ranging from two to ten, either with or without the supervision of a music teacher; to organize such a game in such a manner that it may be played either as a single game adapted to the requirements and sustained interest of the more advanced students or may, through sub-divisions, be suited to the capacity of less proficient students; to furnish entertaining and profitable drill in particular phases of the subject which may or may not be supervised.

More particularly stated with reference to the game as illustrated in the drawings, my objects are to provide an instructional musical harmony game in the playing of which the pupils will be drilled to an instant recognition of all major triads in any position or inversion in which they may be written employing chromatic signs for any tones of the chord that are flatted or sharped; to immediate recognition of any major triad in any position or inversion in which it may appear; to immediate recognition of the root of any major triad in any position or inversion in which it may appear; in recognition of the relation between the most important chord of the key (tonic triad) and those two chords which are next in order of importance (the dominant and sub-dominant triads)—in each major key when they appear in conjunction with a key signature;—all this leading to the complete understanding and ability to recognize these chords in progression and resolution.

A further object is to promote drill necessary to attain these results under conditions which arouse interest, compel concentration, sustained effort, quickened perception and responsiveness.

The drawing illustrates twelve specimen cards, of which cards 1, 2, 3 and 4 are taken from one book in a tonic triad set or book of which there are fifteen books. Cards 5, 6, 7 and 8 illustrate four specimen cards of a book in a corresponding principal chord set or deck of fifteen books, and cards 9, 10, 11 and 12 illustrate four specimen cards in a book of an associated cadence set or deck of fifteen books.

The cards in each book comprise a signature card and three other cards pertaining to the same key. Each book represents a different key, and the 15 books of the deck may therefore be representative respectively of keys C, G, D, A, E, B, F♯, C♯, F, B♭, E♭, A♭, D♭, G♭ and C♭, indicated in each case by a signature card, such for example, as the card 1, which is a member of a book belonging to the tonic triad deck; the card 5 which is a member of a book belonging to the principal chord deck, and the card 9 which is a member of a book belonging to the cadence deck.

The signature card 1 indicates the key of A, and in card 2 the tonic triad appears without the signature in its first position for the key of A, the C♯ of this triad being indicated by the chromatic sign. The pupil learns to recognize the position or inversion of the triad from the relative position of the notes on the staff and to pick out the root of the triad, and recognize by name any triad he may hold. This enables him to know to what book it belongs and he will thus understand what cards are required in order to complete the book. The card shown in card 3 illustrates the triad in its second position (or first inversion), and the card shown in card 4 illustrates it in its third position (or second inversion), the three cards shown in cards 2, 3, and 4 being otherwise alike.

The tonic triad deck, therefore, drills the player to recognize the various positions or inversions of the most important chord (the tonic triad) in each of the 15 keys represented by the deck, and provides drill in quick and accurate recognition of the signatures of those keys.

The cards illustrated in cards 5, 6, 7, and 8 show a specimen book of the principal chord deck and are similar to those illustrated in cards 1 to 4, in that there is a signature card as illustrated in card 5, associated in a book with three other chord bearing cards. These triads, however, are built on different degrees of the scale indicated by the key signature which appears on each card of this,—the principal chord deck. Accordingly, the card illustrated in card 6 shows the most important chord (the tonic triad) in the key indicated by the signature card in card 5. The card shown in card 7 indicates the next most important chord,—the dominant chord in that key and the card shown in card 8 indicates the next most important chord in the key,—i. e. the sub-dominant chord.

Each of the 15 books composing the principal chord deck is like the ilustrated specimen book except that the signature card indicates a different key and the other cards bear that signature, together with either the tonic dominant or sub-dominant chords of the key indicated by that signature card.

The cards in the cadence deck drill the pupil in the use of these three principal chords of the key in combination, teaching the first steps in harmonic progression and resolution. Each book comprises a signature card as illustrated in card 9; also a card indicating the tonic triad of that key in its first position as illustrated in card 10; also a card indicating the perfect authentic cadence of that key as illustrated in Figure 11; and a fourth card indicating the plagal cadence of that key as illustrated in card 12. In this cadence deck the signature appears only on the signature card of each book, and the remaining three cards of each book bear the same relation to the signature card that cards 10, 11, and 12 of the specimen book do to card 9. The cards of this deck are, therefore, adapted to teach the harmony student the first steps in chord progression through the medium of the principal chords of the key in combinations forming cadences. The student of harmony thus learns that the plagal cadence is formed by the resolution of the sub-dominant chord into the tonic, and that the perfect authentic cadence is formed by the resolution of the dominant chord into the tonic. The dominant 7th chord which is used in the cadence deck is an outgrowth of the dominant triad, it being the dominant triad with the 7th added,—a larger chord than a triad. Its use trains the player to an appreciation of a fuller more satisfying cadence than would result from the employment of the common dominant triad.

It will be understood by those skilled in this art that each deck may be played separately or in combination with the other decks, the desirability of using one deck or all three decks being dependent in part on the number of players and in part upon their proficiency or the desirability of drill and in any particular phase of the subject. Similarly, the number of books in the deck may be decreased and any group of keys played for the purposes of special drill to enable beginners to concentrate their efforts on the books pertaining to a limited number of keys in any one of the decks. For example, the proficiency of the student or desirability of drill in any particular phase of the subject will suggest reducing any one of these decks to correspond with the indicated needs by decreasing the number of books, taking out, for instance, all books belonging to flat keys for use with students who are familiar only with the sharp keys, or by removing some card or cards from each book of the deck. The perfect authentic cadence card could be removed from each book in the cadence deck and the reduced deck used by pupils who are familiar only with the plagal cadence. Each book, of course, will then be composed of three cards instead of four.

The game is adapted to be played in a manner similar to that in which the well-known game of "Authors" is played, the cards being shuffled and dealt to the respective players, each player being preferably given two cards under ordinary conditions, although if only two persons are playing it will be desirable to deal four cards to each player. The remaining cards of the deck will then be placed in the center of the table and drawn during the progress of the game. A player recognizing a card in his hand as belonging to a certain book may call upon another player for any one of the remaining cards belonging to that book, continuing to call until he fails to get the card called for. Thereupon he draws a card from the deck and the turn passes to the next player. When a book is completed it is placed upon the table in front of the player completing it, face up, with signature card on top, and the player completing the largest number of books is regarded as the winner. In cases where the game is supervised by a teacher, each player may be penalized for taking an unreasonable length of time to make his call by losing his turn and his opportunity to draw from the deck. One great distinguishing difference between this game and the game of "Authors" as applied to other educational subjects, is that in this game each card bears only one symbol. There is no accompanying symbol on any card to indicate what other cards belong to that book. This provides a much more active mental drill than could otherwise be obtained.

I claim:

1. An instructional musical harmony game comprising a series of book sets of cards, the cards of each set comprising a key signature card and a set of chord bearing cards written in the key indicated by the signature card, whereby a player holding one of the cards in a book may obtain the others by calling for them from other players or by drawing them from the deck.

2. An instructional musical harmony game comprising a multiple series of book sets of cards, the cards of each set comprising a signature card and a set of chord bearing cards written in the same key, the book sets of one series being printed to indicate positions of the tonic triads in various keys, those of another series indicating the principal chords in the same keys, and those of another series indicating cadences in such keys.

3. An instructional musical harmony game comprising a series of book sets of cards, one book set comprising a signature card and associated chord bearing cards written in the same key to indicate a characteristic principle of harmony, and other book sets each composed of the same number of cards written respectively in different keys but otherwise like those of the first mentioned set.

4. An instructional musical harmony game comprising a series of book sets of cards, one book set comprising a signature card and associated chord bearing cards written in the same key to indicate a characteristic principle of harmony, and other book sets, each composed of the same number of cards written respectively in different keys but otherwise like those of the first mentioned set, together with additional series of book sets each series illustrating a different characteristic principle of harmony.

5. An instructional musical harmony card game, comprising the combination of three series of sets of cards in which the cards of one series are printed to indicate positions of the tonic triads in various keys, those of another series correspondingly printed to indicate the principal chords in the same keys, and those of the third series also correspondingly printed to indicate the cadences in such keys, each set comprising a signature card and note carrying cards written in the same key.

6. An instructional musical harmony card game, designed to be played in a manner similar to the game of authors for the purpose of familiarizing pupils with the sight recognition of the tonic triads, principal chords and cadences in each key and their relation to each other within each group set, comprising book sets of cards, one of which is printed for the purpose of indicating signature only, and the others in each set being printed to indicate the note readings for the key indicated by the signature in the group represented by said notes.

7. An instructional musical harmony game comprising a series of book sets of cards, the cards of each set comprising a key signature card and a set of chord bearing cards written in the key indicated by the signature card, some of the chord bearing cards having key signatures thereon and others of the chord bearing cards having accidentals designative of a key, whereby a player holding one of the cards in a book may obtain the others by calling for them from other players or by drawing them from the deck.

8. An instructional musical harmony card game comprising the combination of three series of sets of cards in which the cards of one series are printed to indicate positions of the tonic triads in various keys, the cards of said series having accidentals designative of the respective keys, those of the second series printed to indicate the principal chords in the same keys, the cards of said second series having signatures designative of the respective keys, and those of the third series printed to indicate the cadences in such keys, and corresponding signature cards for each set.

MABEL M. BISHOP.